(12) United States Patent
Desanzo et al.

(10) Patent No.: US 8,731,747 B2
(45) Date of Patent: May 20, 2014

(54) COMMUNICATION SYSTEMS AND METHOD FOR A RAIL VEHICLE OR OTHER POWERED SYSTEM

(75) Inventors: David Joseph Desanzo, Erie, PA (US); Todd Goodermuth, Melbourne, FL (US); Veni Mudiam, Erie, PA (US); Matthew Joseph, Erie, PA (US); Sethu Madhavan, Erie, PA (US); Enrique David Torres, Erie, PA (US)

(73) Assignee: General Electric Company, Schenectady, NY (US)

( * ) Notice: Subject to any disclaimer, the term of this patent is extended or adjusted under 35 U.S.C. 154(b) by 65 days.

(21) Appl. No.: 13/311,252

(22) Filed: Dec. 5, 2011

(65) Prior Publication Data

US 2012/0277938 A1 Nov. 1, 2012

Related U.S. Application Data

(60) Provisional application No. 61/480,037, filed on Apr. 28, 2011.

(51) Int. Cl.
*G05D 17/00* (2006.01)
*G06F 17/00* (2006.01)
*B61L 27/00* (2006.01)

(52) U.S. Cl.
CPC ............... *G06F 17/00* (2013.01); *B61L 27/00* (2013.01); *B61L 2205/04* (2013.01)
USPC ............................... 701/19; 701/36; 701/29.1

(58) Field of Classification Search
CPC ...... G07C 5/008; G07C 5/0808; G07C 5/085; G06F 11/2028; G06F 11/2035; G06F 11/2046; G06F 11/3013; G06F 11/3051; G06F 11/328; G06F 17/5095; G06F 2217/04; G06F 3/0219; G06F 3/0233; G06F 3/0237; G06F 3/0238; G06F 8/65; G06F 17/00; B61L 2205/04; B61L 27/00
USPC ...................... 701/1–4, 19, 29.1, 36
See application file for complete search history.

(56) References Cited

U.S. PATENT DOCUMENTS 4,336,593 A * 6/1982 Takase .......................... 701/115
4,428,052 A * 1/1984 Robinson et al. ............. 701/117
5,167,008 A * 11/1992 Engeler .......................... 706/43

(Continued)

FOREIGN PATENT DOCUMENTS

WO 2009024506 A1 2/2009

OTHER PUBLICATIONS

Search Report and Written Opinion from corresponding PCT Application No. PCT/US2012/035414 dated Nov. 2, 2012.

*Primary Examiner* — Helal A Algahaim
*Assistant Examiner* — Shardul Patel
(74) *Attorney, Agent, or Firm* — GE Global Patent Operation; John A. Kramer (57) ABSTRACT

A communication system for a vehicle includes an input module, a selection module, and a publisher module. The input module is configured to receive data parameters associated with one or more conditions (e.g., states, current operational aspects or modes, operational environmental conditions) of the vehicle. The selection module is configured to select a subset of the data parameters. The publisher module is configured to communicate the data parameters in the subset to one or more applications of the vehicle that use the data parameters to perform one or more operations.

21 Claims, 5 Drawing Sheets

(56) References Cited

U.S. PATENT DOCUMENTS

| | | | |
|---|---|---|---|
| 5,956,250 A | 9/1999 | Gudat et al. | |
| 6,336,120 B1 | 1/2002 | Noddings et al. | |
| 6,487,478 B1 | 11/2002 | Azzaro et al. | |
| 6,928,344 B2 | 8/2005 | McWalter et al. | |
| 6,996,397 B2 | 2/2006 | Fraser et al. | |
| 7,219,067 B1 | 5/2007 | McMullen et al. | |
| 7,222,003 B2 * | 5/2007 | Stull et al. | 701/19 |
| 7,239,859 B2 | 7/2007 | Madhavan et al. | |
| 7,243,012 B2 | 7/2007 | Miyake et al. | |
| 7,269,482 B1 | 9/2007 | Shultz et al. | |
| 7,504,706 B2 | 3/2009 | Swaminathan et al. | |
| 7,577,634 B2 | 8/2009 | Ryan et al. | |
| 7,647,142 B2 | 1/2010 | Desanzo | |
| 7,705,775 B2 | 4/2010 | Madhavan et al. | |
| 7,782,814 B2 | 8/2010 | Fraser et al. | |
| 7,904,219 B1 | 3/2011 | Lowrey et al. | |
| 7,912,149 B2 | 3/2011 | Chesnutt et al. | |
| 8,050,673 B2 | 11/2011 | Madhavan et al. | |
| 8,054,924 B2 | 11/2011 | Madhavan | |
| 2005/0060070 A1 * | 3/2005 | Kapolka et al. | 701/29 |
| 2005/0131595 A1 | 6/2005 | Luskin | |
| 2005/0163727 A1 | 7/2005 | Doyle et al. | |
| 2005/0171661 A1 | 8/2005 | Abdel-Malek | |
| 2006/0193790 A1 | 8/2006 | Doyle et al. | |
| 2007/0042090 A1 * | 2/2007 | Mattson et al. | 426/120 |
| 2007/0092024 A1 | 4/2007 | Madhavan et al. | |
| 2007/0102811 A1 | 5/2007 | Swaminathan et al. | |
| 2007/0120225 A1 | 5/2007 | Swaminathan et al. | |
| 2007/0137514 A1 * | 6/2007 | Kumar et al. | 105/26.05 |
| 2007/0140987 A1 | 6/2007 | Doyle et al. | |
| 2007/0190950 A1 | 8/2007 | Madhavan et al. | |
| 2007/0258398 A1 | 11/2007 | Chesnutt et al. | |
| 2008/0102854 A1 | 5/2008 | Yi et al. | |
| 2008/0125934 A1 * | 5/2008 | Chen et al. | 701/36 |
| 2008/0247484 A1 | 10/2008 | Chesnutt et al. | |
| 2008/0255828 A1 | 10/2008 | Chesnutt et al. | |
| 2009/0172102 A1 | 7/2009 | Chesnutt et al. | |
| 2009/0234522 A1 | 9/2009 | Desanzo | |
| 2009/0249074 A1 | 10/2009 | Madhavan et al. | |
| 2009/0323967 A1 | 12/2009 | Peirce et al. | |
| 2010/0131127 A1 | 5/2010 | DeSanzo | |
| 2010/0167702 A1 | 7/2010 | Madhavan et al. | |
| 2010/0167721 A1 | 7/2010 | Madhavan et al. | |
| 2010/0167722 A1 | 7/2010 | Madhavan et al. | |
| 2010/0167727 A1 | 7/2010 | Madhavan et al. | |
| 2010/0167737 A1 | 7/2010 | Madhavan et al. | |
| 2010/0167745 A1 | 7/2010 | Madhavan et al. | |
| 2010/0185472 A1 | 7/2010 | Goodermuth et al. | |
| 2010/0202616 A1 | 8/2010 | Peirce et al. | |
| 2010/0241295 A1 | 9/2010 | Cooper et al. | |
| 2010/0286853 A1 | 11/2010 | Goodermuth et al. | |
| 2010/0318336 A1 * | 12/2010 | Falangas | 703/8 |
| 2010/0321170 A1 | 12/2010 | Cooper et al. | |
| 2011/0038307 A1 | 2/2011 | Madhavan et al. | |
| 2011/0039527 A1 | 2/2011 | Yi et al. | |
| 2011/0039528 A1 | 2/2011 | Yi et al. | |
| 2011/0039533 A1 | 2/2011 | Yi et al. | |
| 2011/0039538 A1 | 2/2011 | Madhavan et al. | |
| 2011/0039556 A1 | 2/2011 | Yi et al. | |
| 2011/0039587 A1 | 2/2011 | Madhavan et al. | |
| 2011/0060486 A1 | 3/2011 | Meltser et al. | |
| 2011/0068976 A1 | 3/2011 | Basnayake et al. | |
| 2011/0093144 A1 | 4/2011 | Goodermuth et al. | |
| 2011/0099413 A1 | 4/2011 | Cooper et al. | |
| 2011/0144858 A1 | 6/2011 | Yun et al. | |
| 2011/0144911 A1 | 6/2011 | Madhavan et al. | |
| 2011/0217957 A1 | 9/2011 | Macdonald et al. | |
| 2011/0249714 A1 | 10/2011 | Madhavan et al. | |
| 2011/0282525 A1 | 11/2011 | Kraeling et al. | |
| 2011/0284699 A1 | 11/2011 | Cooper et al. | |
| 2011/0284700 A1 | 11/2011 | Brand et al. | |
| 2011/0294466 A1 | 12/2011 | Tang et al. | |

* cited by examiner

COMMUNICATION SYSTEMS AND METHOD FOR A RAIL VEHICLE OR OTHER POWERED SYSTEM

CROSS-REFERENCE TO RELATED APPLICATIONS

This application claims the benefit of U.S. Provisional Application Ser. No. 61/480,037, filed 28 Apr. 2011, which is incorporated by reference in its entirety.

BACKGROUND

Certain powered systems (e.g., powered vehicles or vehicle consists) include communication systems that periodically obtain measurements related to the health, operational status, state, or other conditions of one or more sub-systems of the powered system. For example, locomotives in a rail vehicle consist ("consist" referring to a group of vehicles linked to travel together along a route) may include communication systems that periodically receive measurements related to operations of the locomotive, such as speed, horsepower, temperature, brake pressure measurements, and the like. These measurements can be referred to as data parameters. For example, measurements of speed of a traction motor may be a first data parameter, measurements of brake pressures may be a second data parameter, and so on.

Many data parameters may be obtained for a locomotive or other powered system. The list of data parameters that are obtained for the locomotive or other powered system may be referred to as a master list of the data parameters. In some known locomotives, the number of data parameters in the master list may be relatively large, such as 800 or more data parameters. The data parameters are periodically communicated in messages to one or more software applications. The software applications use the data parameters to perform one or more operations, such as to monitor the fuel efficiency of the locomotive, to control tractive operations of the locomotive, and the like. The software applications request the data parameters from the communication system based on which data parameters are needed for the applications to perform their associated operations. Different software applications can request different data parameters relative to each other.

The acts of obtaining new values of the data parameters and the communication of the data parameters to the applications may occur in a periodic basis. For example, updated values of one or more of the data parameters in the master list may be obtained and communicated to the applications every second or every few seconds. Different messages that are transmitted to the applications may include different groups of the data parameters. Due to constraints on the system, the system may be unable to communicate updated values of the data parameters for all data parameters in the master list. As a result, the system may communicate the values of only a portion of the data parameters in a periodic manner.

However, one or more software applications may request new or different data parameters relative to previously requested data parameters by the same software applications and/or may request data parameters that differ from one or more other software applications. For example, a software application may request a data parameter that is not included in the data parameters being periodically communicated by the system. Requesting new or different data parameters from the system can cause the system to automatically reconfigure which data parameters are periodically communicated. Such a reconfiguration can cause the system to interrupt the flow of the data parameters to the other applications that have not requested new or different data parameters. As a result, one or more applications may not receive the necessary data parameters from the system as needed by the applications. For example, applications that may be critical for safe operation of the locomotive or other powered system may not receive the necessary data parameters when needed due to reconfigurations.

A need exists for a communication system and method for a vehicle or other powered system that reduces the frequency at which the reconfiguration of communicated data parameters occurs.

BRIEF DESCRIPTION

One embodiment relates to a communication system for a rail vehicle or other powered system (e.g., rail vehicle, rail vehicle in a consist, other vehicle, marine vessel, stationary power generating unit, and the like). The communication system includes an input module, a selection module, and a publisher module. The input module is configured to receive data parameters associated with one or more conditions (e.g., states, current operational aspects or modes, operational environmental conditions) of the rail vehicle or other powered system. The selection module is configured to select a subset of the data parameters. The publisher module is configured to communicate the data parameters in the subset to one or more applications that use the data parameters to perform one or more operations. ("Application" refers to a computer or other processor-based device or other electronics system that is configured to execute a set of program instructions, that when executed cause the electronics system to perform a designated function or functions as specified by the set of program instructions; or to an electronics system that is configured, other than through a set of program instructions, to perform the designated function or functions; or to the set of program instructions configured to be executed by the electronics system for carrying out the designated function or functions.)

Another embodiment relates to a method for communicating data parameters in powered system, e.g., a rail vehicle. The method includes receiving values of data parameters associated with one or more states or conditions of the rail vehicle or other powered system, selecting a subset of the data parameters, and publishing the data parameters in the subset to one or more applications that use the data parameters to perform one or more operations.

In another embodiment, a computer readable storage medium for a communication system of a rail vehicle or other powered system that includes a processor is provided. The medium includes one or more sets of instructions that direct the processor to receive data parameters associated with one or more conditions of the rail vehicle or other powered system, select a subset of the data parameters, and publish the data parameters in the subset to one or more applications that use the data parameters to perform one or more operations.

DETAILED DESCRIPTION

The foregoing brief description, as well as the following detailed description of certain embodiments of the inventive subject matter, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Figure 1:
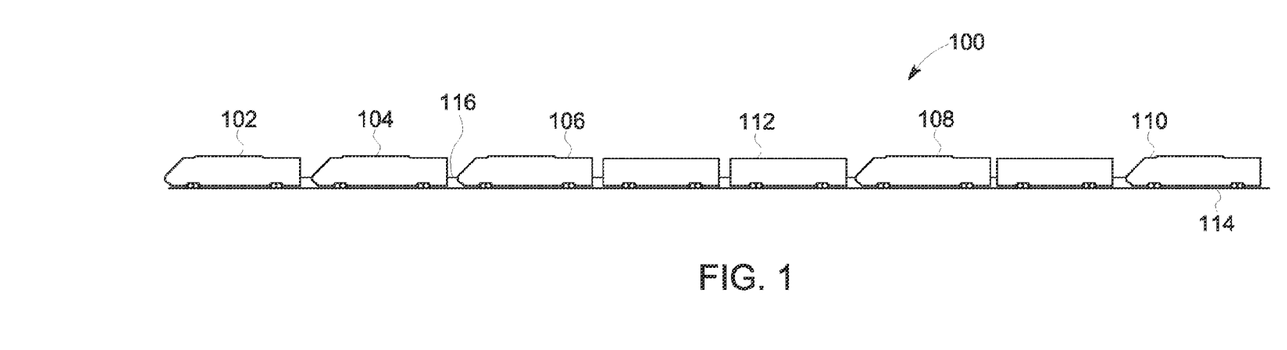
FIG. 1 is a schematic illustration of one embodiment of a rail vehicle consist.

FIG. 1 is a schematic illustration of one embodiment of a rail vehicle consist 100. The consist 100 includes a lead powered unit 102 mechanically coupled with several trailing or remote powered units 104, 106, 108, 110 and non-powered units 112. The consist 100 travels along a track 114. The powered units 102, 104, 106, 108, 110 and/or non-powered units 112 may be referred to as rail vehicles of the consist 100. The lead powered unit 102 and the remote powered units 104, 106, 108, 110 supply tractive forces to propel the consist 100 along the track 114. In one embodiment, the consist 100 includes the lead powered unit 102 as a leading locomotive disposed at the front end of the consist 100 and the remote powered units 104, 106, 108, 110 as trailing locomotives disposed behind the lead powered unit 102 between the lead powered unit 102 and the back end of the consist 100. Alternatively, the lead powered unit 102 may be disposed between one or more of the remote powered units 104, 106, 108, 110 and the back end of the consist 100. The non-powered units 112 may be cars for carrying cargo (e.g., goods and/or passengers) along the track 114. The remote powered units 104, 106, 108, 110 are remote from the lead powered unit 102 in that the remote powered units 104, 106, 108, 110 are not located within (i.e., are not part of) the lead powered unit 102. A remote powered unit 104, 106, 108, 110 need not be separated from the lead powered unit 102 by a significant distance in order for the remote powered unit 104, 106, 108, 110 to be remote from the lead powered unit 102. For example, the remote powered unit 104 may be directly adjacent to and coupled with the lead powered unit 102 and still be remote from the lead powered unit 102. The number of powered units 102, 104, 106, 108, 110 in the consist 100 may vary from those shown in FIG. 1.

One or more conductive communication pathways 116 may extend along the consist 100 and between the powered units 102, 104, 106, 108, 110, 112. The communication pathway 116 can represent a wire or group of wires, such as a trainline or multiple unit (MU) cable, that extends through the consist 100 between the powered units 102, 104, 106, 108, 110 and the non-powered units 112. The communication pathway 116 may be used to communicate data between the powered units 102, 104, 106, 108, 110, 112.

Figure 2:
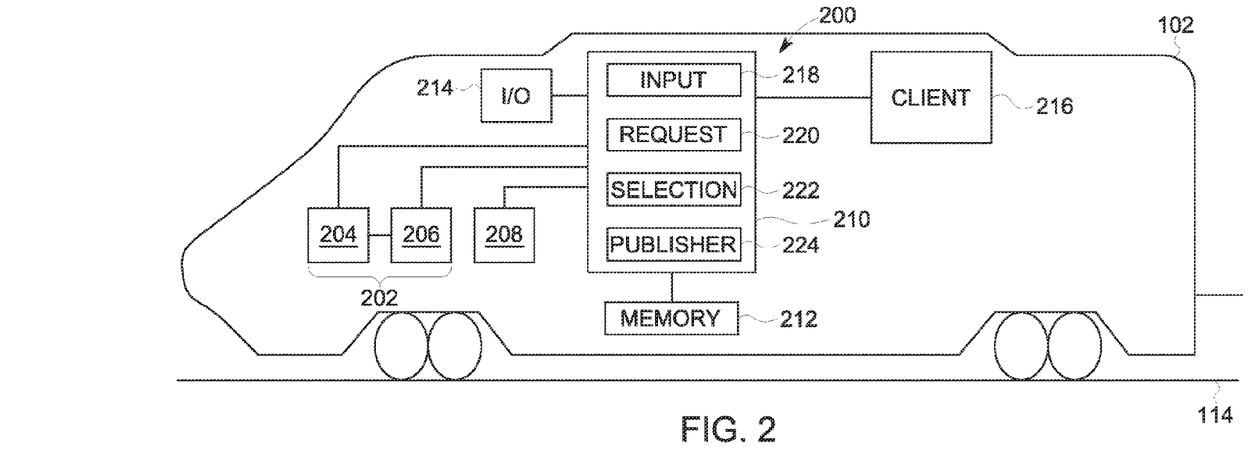
FIG. 2 is a schematic diagram of one embodiment of a communication system.

FIG. 2 is a schematic diagram of one embodiment of a communication system 200. The communication system 200 is shown in FIG. 2 as being disposed on board the lead powered unit 102. The communication system 200 may be disposed on board another powered and/or non-powered unit 104, 106, 108, 110, 112 (shown in FIG. 1) in another embodiment. For example, a plurality of the powered units 104, 106, 108, 110 may include the communication system 200.

The powered unit 102 includes a propulsion subsystem 202 that provides tractive effort (e.g., motive power) to propel the powered unit 102 along the track 114. The propulsion subsystem 202 includes one or more engines 204 (e.g., diesel engines) and one or more motors 206 (e.g., traction motors). The engines 204 consume fuel to rotate the motors 206, which in turn rotate axles and wheels of the powered unit 102 to propel the powered unit 102. The powered unit 102 includes one or more brakes 208 that slow down and/or stop movement of the powered unit 102.

The communication system 200 includes a processor 210, such as one or more computer processors, microprocessors, controllers, microcontrollers, hardware devices, programmable logic-based devices, dedicated and/or hard-wired state machines, or a combination thereof. The processor 210 operates based on one or more sets of instructions. The sets of instructions can include one or more software applications or programs stored on computer readable storage media, such as a memory 212. The memory 212 may be a tangible and non-transitory computer readable storage medium, such as a solid-state, electromagnetic, and/or optical memory. The memory 212 can be volatile, nonvolatile, or a mixture thereof. Some or all of the memory 212 can be portable, such as a disk, card, memory stick, cartridge, and the like.

The processor 210 obtains data parameters related to one or more components of the powered unit 102. (For example, the processor may receive signals containing the data parameters from on-board sensors.) The data parameters may be related to control, operational, and/or health conditions of the powered unit 102 and/or one or more components of the powered unit 102. All or at least a plurality of the data parameters associated with the powered unit 102 and/or the components of the powered unit 102 may be defined in a master set of the data parameters. Examples of various data parameters of the powered unit 102 may include horsepower measurements of the traction motors 206, pressure levels of the brakes 208, fuel levels of the fuel supplied to the engine 204, temperature measurements, speed of the powered unit 102, wheel slippage, and the like. In one embodiment, a variety of sensors that are communicatively coupled with the processor 210 by one or more wired and/or wireless connections (e.g., busses, wires, and/or wireless networks) can obtain values of the data parameters and report the same to the processor 210. Alternatively, one or more of the data parameters may be reported to the processor 210 by the components themselves. In the illustrated embodiment, the processor 210 is shown as being communicatively coupled with the components that provide at least some of the data parameters. Alternatively, one or more of the couplings shown in FIG. 2 may represent communication links between the processor 210 and one or more sensors. One or more additional components that provide the values of data parameters to the processor 210 may be included. For example, one or more additional sensors, antennas, receivers, and the like, that sense, measure, or receive values of data parameters and can convey the values to the processor 210 may be included in the system 200.

The processor 210 is communicatively coupled with an input/output device 214 ("I/O"). The input/output device 214 represents one or more components that can receive values of data parameters from one or more other components and/or human operators of the consist 100 (shown in FIG. 1). For example, the input/output device 214 may include a keyboard, touchscreen, stylus, and the like, for receiving input from a human operator for one or more values of the data parameters. The input/output device 214 can present information, such as the values of data parameters, to the operator. For example, the input/output device 214 can include a computer monitor, printer, speaker, or other output device that visually and/or audibly presents information to the human operator.

In the illustrated embodiment, the powered unit 102 includes a client application 216 ("client") that performs one or more functions, such as, but not limited to, positive train control applications, energy management applications, train (or other vehicle consist) control applications, vehicle management system applications, event recorder applications, and the like. The client application 216 may be embodied in a computer processor that operates based on one or more sets of instructions, such as a software application. The client application 216 may be an internal application that resides on at least some of the same hardware as the system 200 (e.g., uses the same processor 200). Alternatively, the client application 216 may be an external application that resides on different hardware than the system 200 (e.g., uses a different processor). While only a single client application 216 is shown, alternatively, a plurality of client applications 216 may be present.

As described below, the processor 210 publishes a subset of the master set of data parameters to one or more of the client applications 216. For example, the processor 210 may periodically communicate messages having the values of the data parameters in the subset to the client applications 216. By "periodically," it is meant that the event may occur at regular, repeated time intervals as opposed to irregular or different time intervals (e.g., time intervals that change over time). The client application 216 uses one or more of the data parameters that are published by the processor 210 in connection with one or more of the functions performed by the client application 216.

The processor 210 includes several functional modules that perform various operations. The modules may be embodied in one or more sets of instructions stored in the memory 212 that direct the processor 210 to perform one or more operations. In the illustrated embodiment, the processor 210 includes an input module 218 that receives the values of data parameters from the components external to the processor 210. For example, the input module 218 may periodically receive values for all or a plurality of the data parameters in the master set.

A request module 220 receives requests from the client application 216 for one or more of the data parameters. For example, the client application 216 may request the values of one or more data parameters. The request module 220 receives the requests from one or more of the client applications 216 and notifies a selection module 222 of the requests. The requests from the client application 216 may change over time. For example, at a first time $t_1$, the client application 216 may request the data parameters "A," "B," and "C," while at a later, second time $t_2$, the client application 216 may request a different subset of the data parameters that includes the data parameters A, B, and "D." Alternatively, the client application 216 may request additional data parameters, such as the data parameters A, B, C, and D. The letters A, B, C, and D are used to denote different data parameters that may be included in the master set of the data parameters. As described below, the request module 220 may track how often one or more of the data parameters are requested by one or more of the client applications 216 and, based on the frequency at which the data parameters are requested, generate a subset of the master set of data parameters.

A selection module 222 obtains the values of the data parameters that are to be published to the client application 216. As described below, the selection module 222 may obtain the values of the data parameters included in a predefined subset of the master set of data parameters. Alternatively, the selection module 222 may obtain the values of the data parameters included in a dynamically changing subset of the master set of data parameters.

A publisher module 224 publishes the values of the data parameters in a published subset of the master set of data parameters. The published subset may include the data parameters in the predefined subset and/or the dynamically changing subset of parameters that is defined by the request module 220. The publisher module 224 may publish the data parameters by transmitting the values of the data parameters (e.g., regularly periodically transmitting the values, at predetermined time intervals spaced apart by non-zero time periods) to the client application 216 through one or more wired and/or wireless connections with the client application 216.

Figure 3:
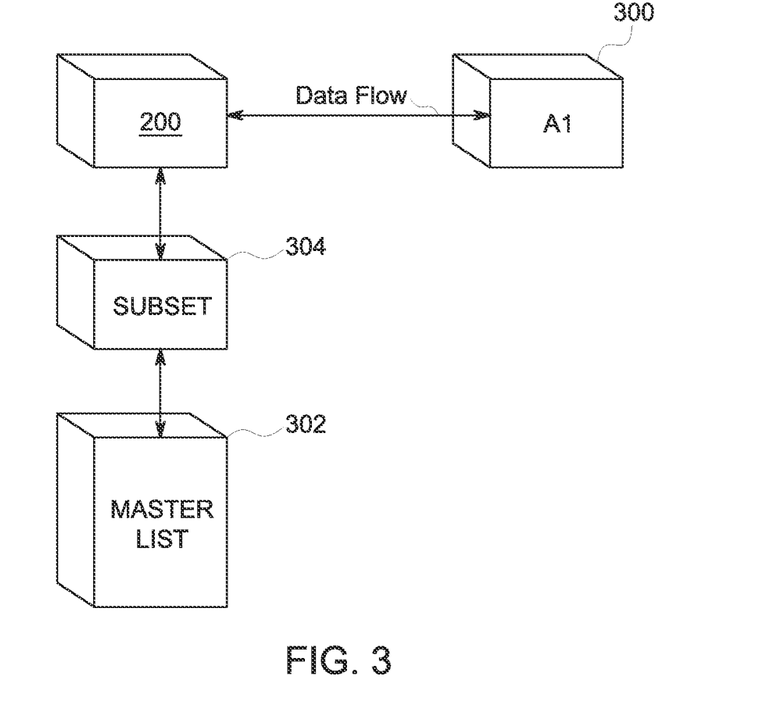
FIG. 3 is a schematic diagram of the communication system shown in FIG. 2 in accordance with one embodiment.

FIG. 3 is a schematic diagram of the communication system 200 in accordance with one embodiment. The system 200 is shown in FIG. 3 as publishing data parameters to an application 300 ("A1") and/or receiving requests for data parameters from the application 300 along the bi-directional arrow labeled "data flow." The arrows labeled data flow may represent one or more wired and/or wireless communication links between the system 200 and the application 300. The application 300 can represent one or more of the client applications 216 shown in FIG. 2. The master set of data parameters is illustrated in FIG. 3 as master list 302. A published subset of the master list 302 is illustrated as subset 304. For example, the subset 304 may include a portion of the data parameters in the master list 302. In one embodiment, if the master list 302 includes 320 data parameters, the subset 304 may include 120 or 240 of the data parameters. The subset 304 includes the data parameters whose values are published to the application 300. For example, the values of the data parameters in the subset 304 may be transmitted to the application 300 while the values of the data parameters in the master list 302 but not in the subset 304 may not be transmitted to the application 300.

In one embodiment, the data parameters that are included in the subset 304 are predetermined. For example, the data parameters in the subset 304 may be manually selected by a human operator of the system 200. The data parameters may be predetermined in that the selection of the data parameters to be included in the subset 304 may be completed before values of the data parameters in the subset 304 are conveyed to the application 300 during a subsequent trip of the consist 100 (shown in FIG. 1). The data parameters that are included in and define the subset 304 may be selected based on requirements of the system 200 and/or the application 300. The application 300 may require a predetermined group of data parameters to perform the function or functions of the application 300. The operator of the system 200 may select the data parameters of the group to be included in the subset 304.

As described above, the selection module 222 (shown in FIG. 2) may obtain values of the data parameters included in the subset 304 and convey the values of the data parameters to the publisher module 224 (shown in FIG. 2). The publisher module 224 may transmit the values of the data parameters in the subset 304 to the application 300 along the path of data flow without transmitting the values of one or more other data parameters in one embodiment. The operator may change the data parameters that are included in the subset 304. For example, based on a change in the application 300, the function(s) performed by the application 300, the addition of more applications 300, and the like, the operator may adjust which of the data parameters in the master list 302 are included in the subset 304 and that are published to the application 300. The request module 220 (shown in FIG. 2) may track requests for various data parameters by the application 300 and store the frequency or number of times that the data parameters are requested. Such information can be recorded in a log or other data structure that is stored in the memory 212 (shown in FIG. 2). The operator can refer to the log or other data structure to determine which data parameters are to be included in the subset 304. For example, the operator may include the most frequently requested data parameters in the subset 304.

The values of the data parameters that are needed or requested by the application 300 to perform the functions of the application 300 may be published to the application 300 without requiring a reconfiguration of the subset 304. For example, the data parameters requested by the application 300 may automatically be included in the predefined subset 304 such that the application 300 need not request the data parameters and the system 200 reconfigure itself to publish the requested data parameters.

Figure 4:
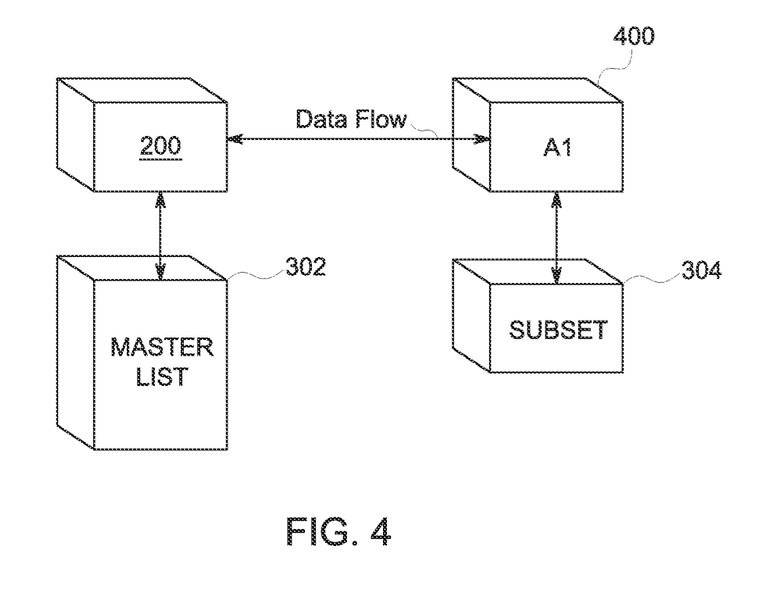
FIG. 4 is a schematic diagram of the communication system shown in FIG. 2 in accordance with another embodiment.

FIG. 4 is a schematic diagram of the communication system 200 in accordance with another embodiment. Similar to the system 200 shown in FIG. 3, the system 200 is shown in FIG. 4 as publishing data parameters to an application 400 ("A1") and/or receiving requests for data parameters from the application 400 along the path of data flow. The application 400 can represent one or more of the client applications 216 shown in FIG. 2.

One difference between the embodiment of the system 200 shown in FIG. 3 and the embodiment of the system 200 shown in FIG. 4 is the storage of the subset 304 of the data parameters at the application 400 instead of at the system 200. For example, the application 400 may be associated with the subset 304 of the data parameters that are predefined and/or manually established by the operator. In one embodiment, the subset 304 is stored or installed on a memory that is accessible to the application 400. The subset 304 limits which data parameters the application 400 may request from the system 200. For example, the subset 304 may be defined by the data parameters that are used to perform one or more of the functions of the application 400.

Prior to requesting data parameters from the system 200, the application 400 may refer to the subset 304 to determine if the application 400 can request one or more of the data parameters. If the requested data parameters are not included in the subset 304, then the application 400 may refrain from requesting the data parameters from the system 200. On the other hand, if the requested data parameters are included in the subset 304, then the application 400 may request the data parameters from the system 200. As described above, the system 200 can publish the data parameters included in the subset 304 to the application 400. Limiting which data parameters can be requested by the application 400 can reduce the number of new or different data parameters that are requested by the application 400. As fewer new or different data parameters are requested, the system 200 may not need to interrupt publication of the data parameters as often to reconfigure which data parameters are published.

Figure 5:
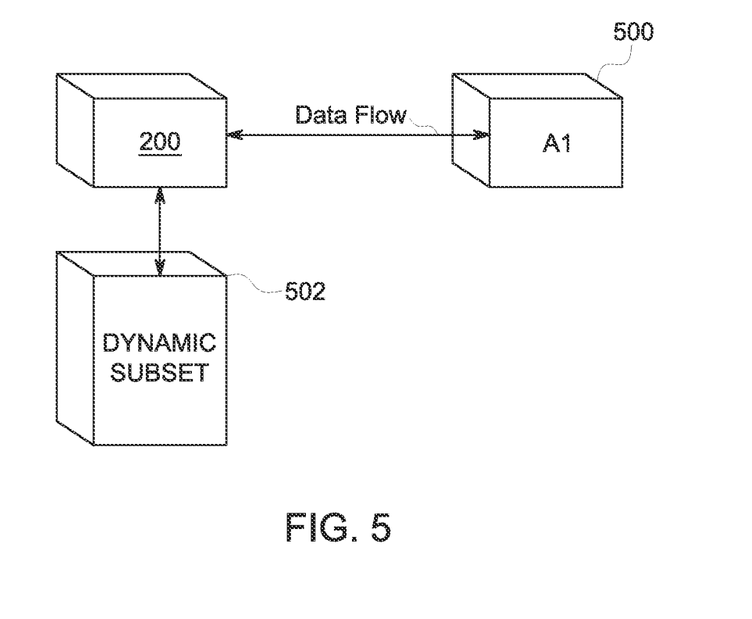
FIG. 5 is a schematic diagram of the communication system shown in FIG. 2 in accordance with another embodiment.

FIG. 5 is a schematic diagram of the communication system 200 in accordance with another embodiment. Similar to the system 200 shown in FIG. 3, the system 200 is shown in FIG. 5 as publishing data parameters to an application 500 ("A1") and/or receiving requests for data parameters from the application 500 along the path of data flow. The application 500 can represent one or more of the client applications 216 shown in FIG. 2.

One difference between the embodiments of the system 200 shown in FIGS. 3 and 4 and the embodiment of the system 200 shown in FIG. 5 is the generation of a dynamic subset 502 of which data parameters are published to the application 500. The dynamic subset 502 may include one or more of the data parameters, but less than all of the data parameters, in the master list 302 (shown in FIG. 3). The list of which data parameters are included in the dynamic subset 502 may change over time based on one or more filters.

As one example of a filter, the filter may be a category filter that includes a designation of a type or category of the system 200. For example, the filter may designate a make, model, or other identifying information associated with one or more components of the system 200 (and/or used to differentiate the system 200 from one or more other systems used in connection with rail vehicles) and associated a subset of the data parameters with the type or category of the system 200. The filter may define which data parameters are to be included in the dynamic subset 502 based on the type of category of the system 200. Different types or categories of the system 200 may be associated with different data parameters such that different dynamic subsets 502 are created.

In another example, a filter may be a frequency filter that is associated with a frequency of requests for data parameters by the application 500. For example, the filter may define which data parameters are to be included in the dynamic subset 502 based on how frequently the data parameters are requested by the application 500. As described above, the request module 220 (shown in FIG. 2) of the system 200 can monitor which data parameters are requested frequently or more often that one or more other data parameters and change which data parameters are included in the dynamic subset 502 based thereon. For example, the request module 220 can include a plurality of the data parameters in the dynamic subset 502 that are requested by the application 500 more often than one or more other data parameters in the master list 302.

In another example, a filter may be a use filter that includes a designation of a type of use of the data parameters. For example, the filter may define how the data parameters are to be used by the application 500. Depending on the operations performed by the application 500, different data parameters may be used. If the application 500 performs safety functions, such as positive train control (PTC) functions that arrest movement of the consist 100 (shown in FIG. 1) from restricted areas, the filter may define a first subset of the data parameters. If the application 500 performs another function that is not directly related to stopping movement of the consist 100, then the filter may include a different, second subset of the data parameters. For example, an application 500 that monitors fuel efficiency of the consist 100 may require a different subset of the data parameters to perform the functions of the application 500 than another, different application 500 that controls tractive operations of the consist 100.

In another example, the filter may include a priority filter that determines which data parameters are included in the dynamic subset 502 based on priorities associated with the data parameters. A priority value may be associated with each of a plurality, or all, of the data parameters in the master list 302 (shown in FIG. 3). The priority values may be assigned based on the use of the data parameters. For example, data parameters associated with tractive operations of the consist 100 (shown in FIG. 1) may be given a higher priority value than data parameters associated with informational data, such as temperature measurements. The request module 220 (shown in FIG. 2) may compare the priority values associated with the data parameters in the master list 302 (shown in FIG. 3) and include the data parameters in the dynamic subset 502 that have priority values that exceed a priority threshold of the filter.

The request module 220 (shown in FIG. 2) may use one or more of the filters to determine which data parameters from the master list 302 (shown in FIG. 3) are included in the dynamic subset 502. The request module 220 may periodically update the dynamic subset 502. For example, the request module 220 may apply one or more of the filters described above to the data parameters in the master list 302 several times during a trip of the consist 100 (shown in FIG. 1) to determine which data parameters are included in the dynamic subset 502. Alternatively, the request module 220 may update the dynamic subset 502 when prompted by the operator. In another embodiment, the request module 220 may update the dynamic subset 502 when a frequency of reconfigurations of the system 200 exceeds a threshold associated with the filter. The publisher module 224 (shown in FIG. 2) transmits the values of the data parameters that are currently included in the dynamic subset 502 to the application 500, as described above.

In another embodiment, the application 500 may be associated with the dynamic subset 502. For example, the data parameters that may be requested by the application 500 may be limited by the dynamic subset 502, similar to how the application 400 shown in FIG. 4 is limited to requesting data parameters from the subset 304. The dynamic subset 502 may be updated as described above based on one or more filters.

In another embodiment, the master list 302 of the system 200 is replaced with the dynamic subset 502. For example, the data parameters that can be requested by the application 500 may be limited to those data parameters that are included in the current dynamic subset 502.

Figure 6:
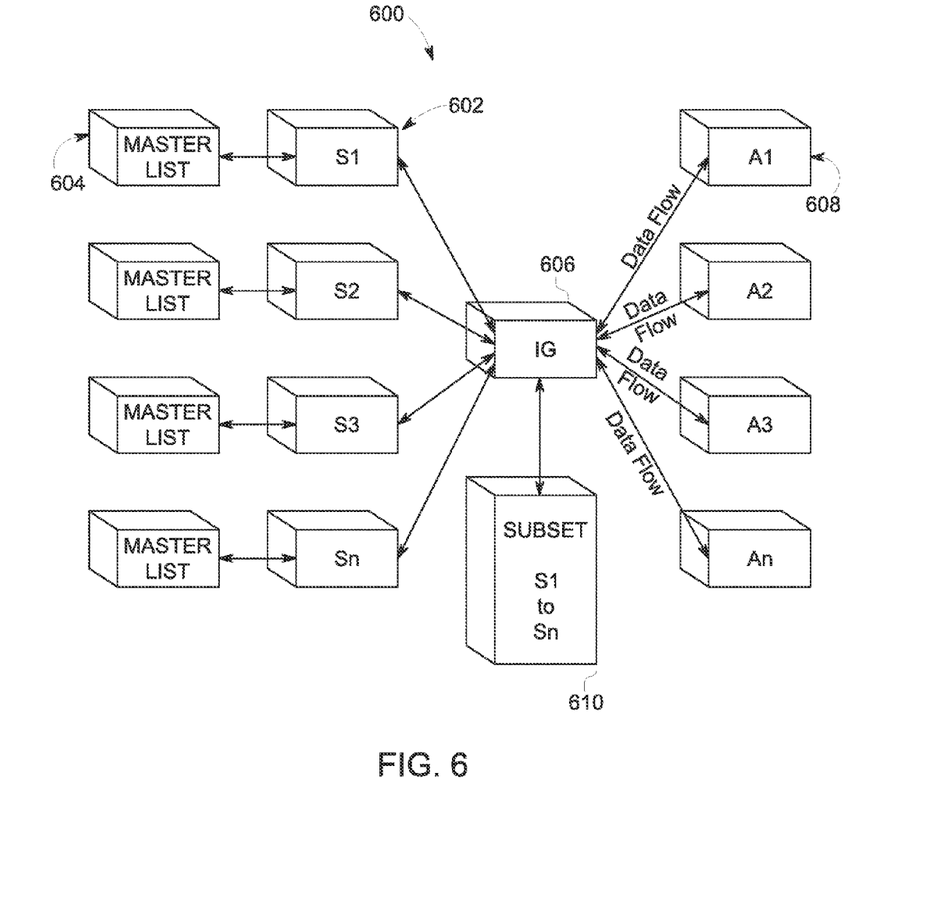
FIG. 6 is a schematic diagram of a communication system in accordance with another embodiment.

FIG. 6 is a schematic diagram of a communication system 600 in accordance with another embodiment. The system 600 includes several subsystems 602 that are communicatively coupled with an interface gateway 604. The subsystems 602 are generally referred to by the reference number 602 and individually labeled "S1," "S2," "S3," and "Sn." Each of the subsystems 602 may represent a separate communication system that can be similar to the system 200 (shown in FIG. 2). For example, each subsystem 602 may include a processor having several modules (e.g., an input module, a request module, a selection module, and a publisher module) that is similar to the processor 210 (shown in FIG. 2), an input/output device that is similar to the input/output device 214 (shown in FIG. 2), and/or a memory that is similar to the memory 212 (shown in FIG. 2). Each subsystem 602 may be associated with different components of the same powered unit and/or non-powered unit 102, 104, 106, 108, 110, 112 (shown in FIG. 1). For example, the subsystem S1 may obtain and publish data parameters associated with traction motors in the powered unit 102, the subsystem S2 may obtain and publish data parameters associated with brakes of the powered unit 102, the subsystem S3 may obtain and publish data parameters associated with one or more sensors in the powered unit 102, and so on. Alternatively, different subsystems 602 may be associated with components of different powered units and/or non-powered units 102, 104, 106, 108, 110, 112.

As shown in FIG. 6, the different subsystems 602 may have different master lists 604 of data parameters. The master lists 604 may be similar to the master list 302 (shown in FIG. 3) and may include a plurality or all of the data parameters associated with the corresponding subsystem 602. The subsystems 602 obtain and publish values of one or more of the data parameters in the corresponding master list 604. While four subsystems 602 are shown in FIG. 6, alternatively, the system 600 may include a different number of subsystems 602. For example, the system 600 may include one to three, or more than four subsystems 602.

The system 600 includes an interface gateway 606 ("IG") that is communicatively coupled with the subsystems 602. The interface gateway 606 may include one or more processors, such as one or more computer processors, microprocessors, controllers, microcontrollers, hardware devices, programmable logic-based devices, dedicated and/or hard-wired state machines, or a combination thereof. The processor(s) of the interface gateway 606 may operate based on one or more sets of instructions, such as one or more software applications or programs stored on a tangible and non-transitory computer readable storage medium. The interface gateway 606 is installed between the subsystems 602 and one or more applications 608. The applications 608 may be similar to one or more of the client application 216 (shown in FIG. 2) and/or the application 300, 400, and/or 500 (shown in FIGS. 3 through 5). For example, the applications 608 may request and receive data parameters from the subsystems 602 in order to perform one or more operations, as described above. The applications 608 are generally referred to by the reference number 608 and individually referred to by the labels "A1," "A2," "A3," and "An." While four applications 608 are shown in FIG. 6, alternatively, a smaller or greater number of applications 608 may be included.

In one embodiment, the interface gateway 606 acts as an intermediate data parameter or message arbitrator between the subsystems 602 and the applications 608. For example, instead of the applications 608 requesting the values of the data parameters directly from the subsystems 602 (e.g., without the data parameters being passed through the interface gateway 606), one or more of the applications 608 communicates request for the data parameters from one or more of the subsystems 602 to the interface gateway 606. The interface gateway 606 receives the requests and determines which of the subsystems 602 are associated with different data parameters. For example, the master lists 604 of data parameters associated with a plurality of the subsystems 602 may be different from each other because the plurality of the subsystems 602 may be associated with different data parameters. The interface gateway 606 refers to a subset 610, such as a table, database, list, or other memory structure that lists the data parameters in the master lists 604 with the different subsystems 602 to determine which of the subsystems 602 are associated with the data parameters sought by the received request. In one embodiment, for one or more of the subsystems 602, the subset 610 associates a subset of the data parameters in the master list 604 for the corresponding subsystem 602 with that subsystem 602.

The interface gateway 606 may use one or more of the techniques described above to determine which data parameters are published to the applications 608 while reducing the number of times the subsystems 602 reconfigure themselves due to new data parameter requests. For example, the interface gateway 606 may refer to a subset of data parameters that is similar to the subset 304 (shown in FIG. 3). Different subsets may be associated with the different subsystems 602 and the subsystems 602 and the interface gateway 606 may only publish the data parameters listed in the subsets associated with the different subsystems. The subsets may be manually established, as described above. As another example, different subsets may be associated with the different applications 608, similar to the subset 304 (shown in FIG. 3). In another embodiment, the interface gateway 606 may refer to one or more dynamic subsets that are similar to the dynamic subset 502 shown in FIG. 5.

The interface gateway 606 may include proprietary, non-proprietary, or a combination thereof, of message interfaces to the applications 608 and to the subsystems 602 to allow proprietary or non-proprietary applications 608 produced by a first party to interface with proprietary or non-proprietary subsystems 602 of a different, second party.

The interface gateway 606 can issue requests to the subsystems 602 to publish data parameters listed in the subset 610 of the interface gateway 606 and the subsystems 602 can publish the corresponding data parameters, even if no application 608 is requesting the data parameters. The interface gateway 606 can control which data parameters the applications 608 are permitted to request from the subsystems 602. Controlling which data parameters that the applications 608 can request may allow for one or more of the applications 608 to request one or more of the data parameters listed in the subset 610 of the interface gateway 606 without requiring a reconfiguration of the subsystems 602.

Figure 7:
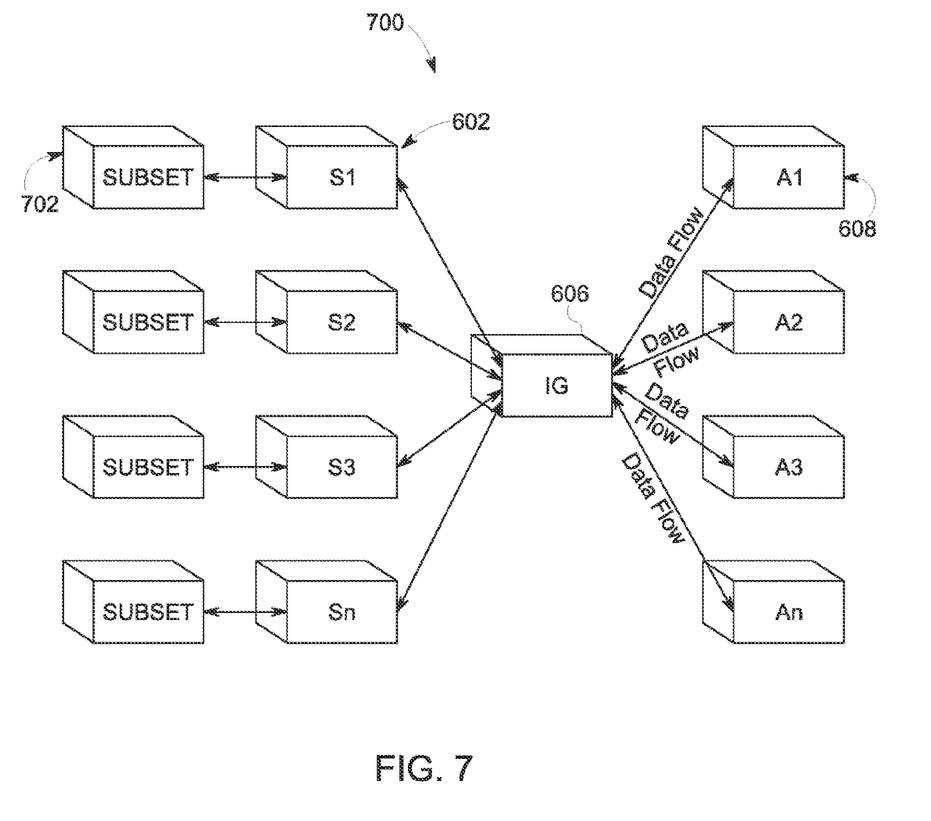
FIG. 7 is a schematic diagram of a communication system in accordance with another embodiment.

FIG. 7 is a schematic diagram of a communication system 700 in accordance with another embodiment. The system 700 may be similar to the system 600 shown in FIG. 6. For example, the system 700 may include the interface gateway 606 that communicates with a plurality of the subsystems 602 to provide values of data parameters requested by one or more of a plurality of the applications 608. One difference between the system 700 and the system 600 is that each of the subsystems 602 are associated with a separate subset 702 of data parameters that may be requested from the subsystem 602. For example, instead of the subset 610 (shown in FIG. 6) storing the data parameters that are associated with and may be requested from each of the subsystems 602, the subsets 702 may be separately associated with the subsystems 602 and include lists of the data parameters that can be requested from and published by the different subsystems 602. The subsets 702 may be manually or automatically created. In one embodiment, the subsets 702 can be dynamically changed over time, as described above.

Any of the embodiments described herein are also applicable for communicating data in vehicle consists generally. "Vehicle consist" refers to a group of vehicles that are mechanically coupled or linked together to travel along a route.

In one embodiment, a method for publishing data parameters of a vehicle in a vehicle consist, such as data parameters of a rail vehicle of a rail vehicle consist, is provided. The method may include obtaining values for data parameters associated with the vehicle. For example, values for data parameters included in a master list of data parameters associated with a communication system of the vehicle may be obtained. A subset of the data parameters in the master list can be consulted to determine which of the data parameters are to be published to one or more applications. For example, less than all of the data parameters in the master list may be published to applications that use the data parameters to perform one or more operations, such as vehicle control, performance tracking, and the like. The subset of the data parameters may be manually or automatically established, as described above. In one embodiment, the subset of the data parameters is dynamically updated based on one or more filters, also as described above.

The method may include a publishing module referring to the subset to determine which data parameters to publish to the applications. Alternatively, the applications may refer to one or more subsets of the data parameters to determine which data parameters may be requested from the system, as described above. In another embodiment, the method may include the applications transmitting requests for data parameters to an interface gateway that refers to one or more subsets of data parameters associated with different communication subsystems, as described above. The data parameters that are requested and that are included in the subsets can be published from the subsystems to the applications, such as through the interface gateway. Alternatively, the subsystems may have associated subsets of the data parameters that can be published to the applications, as described above.

One embodiment relates to a communication system for a vehicle that includes an input module, a selection module, and a publisher module. The input module is configured to receive data parameters associated with one or more conditions (e.g., states, current operational aspects or modes, operational environmental conditions) of the vehicle. The selection module is configured to select a subset of the data parameters. The publisher module is configured to communicate the data parameters in the subset to one or more applications of the vehicle that use the data parameters to perform one or more operations. ("Application" refers to a computer or other processor-based device or other electronics system that is configured to execute a set of program instructions, that when executed cause the electronics system to perform a designated function or functions as specified by the set of program instructions; or to an electronics system that is configured, other than through a set of program instructions, to perform the designated function or functions; or to the set of program instructions configured to be executed by the electronics system for carrying out the designated function or functions.)

In another aspect, the subset of the data parameters is a manually predetermined subset of the data parameters.

In another aspect, the selection module is configured to dynamically modify which of the data parameters are included in the subset.

In another aspect, the data parameters in the subset are dynamically modified by changing one or more of the data parameters in the subset one or more times during an operational cycle of the vehicle.

In another aspect, the selection module is configured to apply one or more filters to determine which of the data parameters are included in the subset.

In another aspect, the filters include at least one of a category filter that includes the data parameters in the subset based on a type of the data parameters, a frequency filter that includes the data parameters in the subset based on frequencies at which the applications request the data parameters, a use filter that includes the data parameters in the subset based on how the data parameters are used by the applications, and/or a priority filter that includes the data parameters in the subset based on priority values assigned to the data parameters.

In another aspect, the communication system also includes an interface gateway disposed between the publisher module and the applications. The interface gateway is configured to arbitrate requests from the applications for the data parameters and publication of the data parameters from the subset of the data parameters.

In another aspect, the publisher module is configured to regularly periodically communicate the data parameters in the subset to the one or more applications at predetermined time intervals. For example, the publisher module may be configured to communicate the data parameters on a regular schedule that involves the data parameters being communicated at regular, non-changing time intervals.

In another aspect, the publisher module is configured to communicate to the one or more applications only the data parameters in the subset, with the subset comprising fewer than all of the data parameters received by the input module. The one or more applications are configured not to request any data parameters from the publisher module other than the data parameters in the subset. For example, the subset may be a "strict" or "static" subset of data parameters that can be communicated by the publisher module. Requests for other data parameters outside of this subset are not honored (e.g., are not responded to with the data requests) in one embodiment.

In another embodiment, a communication system for a vehicle includes an input module, a selection module, and a publisher module. The input module is configured to receive data parameters associated with one or more conditions of the vehicle. The selection module is configured to output a selection of a subset of the data parameters. The publisher module is configured to publish the data parameters in the subset to one or more applications of the vehicle that use the data parameters to perform one or more operations. The publisher module also is configured to publish the data parameters in the subset to the one or more applications of the vehicle irrespective of communication of requests for the data parameters from the one or more applications. For example, during the time period that the publisher is operational to communicate the data parameters, the publisher module may only communicate those data parameters that are included in the subset, independent of and regardless of the number, frequency, and/or timing of requests for these data parameters and/or data parameters that are outside of the subset.

In another aspect, the publisher module is configured to publish the data parameters in the subset during an entirety of a time that the publisher module is operational to communicate data parameters generally.

In another aspect, during all operational modes of the applications, the one or more applications are configured to request only the data parameters in the subset from the publisher module.

In another aspect, during at least one operational mode of the applications, the one or more applications are configured to request only the data parameters in the subset from the publisher module.

In another aspect, out of a totality of the data parameters requested by the one or more applications from the publisher module, the applications are configured to request the data parameters in the subset as at least ninety percent of the totality.

In another aspect, out of a totality of the data parameters requested by the one or more applications from the publisher module, the applications are configured to request the data parameters in the subset as at least ninety-five percent of the totality.

In another aspect, the one or more applications are configured to request from the publisher module data parameters that are not in the subset only if the data parameters that are not in the subset have a priority value that is above a designated priority threshold. For example, different data parameters (or groups of related data parameters) may be associated with different priority values. Some data parameters, such as those relating to the safety or health of the vehicle, may have higher priority values than other data parameters, such as those that relate to non-safety or health aspects, such as providing heating or cooling of compartments inside the vehicle and/or other non-essential functionality. The applications may only be configured or allowed to request those data parameters that are associated with higher priority values than some designated threshold priority value. The designated threshold priority value may be a default value, or may be manually adjusted to change how many requests for data parameters are honored by the publisher module.

In another embodiment, a communication system for a vehicle includes an input module, a selection module, and a publisher module. The input module is configured to receive data parameters associated with one or more conditions of the vehicle. The selection module is configured to output a selection of a subset of the data parameters. The publisher module is configured to publish the data parameters in the subset to one or more applications of the vehicle that use the data parameters to perform one or more operations. The publisher module also is configured to publish only the data parameters in the subset unless a request for a data parameter not in the subset is received from one of the one or more applications and the request is a above a designated priority threshold.

In another aspect, the priority threshold is set such that out of a totality of the data parameters published by the publisher module, the data parameters in the subset comprise at least ninety percent of the totality (or another value that comprises the majority or supermajority of the totality of data parameters).

In another aspect, the priority threshold is set such that out of a totality of the data parameters published by the publisher module, the data parameters in the subset comprise at least ninety-five percent of the totality.

Another embodiment relates to a method for communicating data parameters in powered system, e.g., a rail vehicle. The method includes receiving values of data parameters associated with one or more states or conditions of the rail vehicle or other powered system, selecting a subset of the data parameters, and publishing the data parameters in the subset to one or more applications that use the data parameters to perform one or more operations.

In another aspect, the selecting step includes manually selecting a predetermined subset of the data parameters.

In another aspect, the selecting step includes dynamically modifying which of the data parameters are included in the subset. (The step may be carried out by a processor or other electronics system.)

In another aspect, the data parameters in the subset are dynamically modified by changing one or more of the data parameters in the subset one or more times during an operational cycle of the powered system, e.g., a trip of a vehicle or vehicle consist. (The step may be carried out by a processor or other electronics system.)

In another aspect, the selecting step includes applying one or more filters to determine which of the data parameters are included in the subset. (The step may be carried out by a processor or other electronics system.)

In another aspect, the filters include at least one of a category filter that includes the data parameters in the subset based on a type of the data parameters, a frequency filter that includes the data parameters in the subset based on frequencies at which the applications request the data parameters, a use filter that includes the data parameters in the subset based on how the data parameters are used by the applications, and/or a priority filter that includes the data parameters in the subset based on priority values assigned to the data parameters.

In another embodiment, a computer readable storage medium for a communication system of a rail vehicle or other powered system that includes a processor is provided. The medium includes one or more sets of instructions that direct the processor to receive data parameters associated with one or more conditions of the rail vehicle or other powered system, select a subset of the data parameters, and publish the data parameters in the subset to one or more applications that use the data parameters to perform one or more operations.

In another aspect, the medium is a tangible and non-transitory computer readable storage medium.

In another aspect, the sets of instructions direct the processor to select the data parameters from a manually selected subset of the data parameters.

In another aspect, the sets of instructions direct the processor to dynamically modify which of the data parameters are included in the subset.

In another aspect, the data parameters in the subset are dynamically modified by changing one or more of the data parameters in the subset one or more times during an operational cycle of the powered system, e.g., a trip of a vehicle or vehicle consist.

In another aspect, the sets of instructions direct the processor to apply one or more filters to determine which of the data parameters are included in the subset.

In another aspect, the filters include at least one of a category filter that includes the data parameters in the subset based on a type of the data parameters, a frequency filter that includes the data parameters in the subset based on frequencies at which the applications request the data parameters, a use filter that includes the data parameters in the subset based on how the data parameters are used by the applications, and/or a priority filter that includes the data parameters in the subset based on priority values assigned to the data parameters.

In another embodiment, another system includes an interface gateway that is configured to interface plural of elements of a communication system for a vehicle, or to interface between one or more of the elements of the communication system and one or more other elements, for arbitrating requests from the applications for data parameters and publication of the data parameters from a subset of the data parameters, and/or for another function relating to the data parameters and/or publication of the data parameters. The communication system includes an input module, a selection module, and a publisher module. The input module is configured to receive data parameters associated with one or more conditions of the vehicle. The selection module is configured to select a subset of the data parameters. The publisher module is configured to communicate the data parameters in the subset to one or more applications of the vehicle that use the data parameters to perform one or more operations.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the disclosed subject matter, they are by no means limiting and are exemplary embodiments. Many other embodiments will be apparent to those of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the inventive subject matter, including the best mode, and also to enable any person of ordinary skill in the art to practice the embodiments of inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described communication systems and methods, without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

What is claimed is:

1. A communication system for a vehicle comprising:
one or more processors configured to receive data parameters associated with one or more conditions of the vehicle;
the one or more processors configured to select a subset of the data parameters; and
the one or more processors configured to communicate the data parameters in the subset to one or more applications of the vehicle that use the data parameters to perform one or more operations;
wherein the one or more processors also are configured to dynamically modify which of the data parameters are included in the subset;
wherein the one or more processors also are configured to apply one or more filters to determine which of the data parameters are included in the subset;
wherein the filters include at least one of a category filter that includes the data parameters in the subset based on a type of the data parameters, a frequency filter that includes the data parameters in the subset based on frequencies at which the applications request the data parameters, a use filter that includes the data parameters in the subset based on how the data parameters are used by the applications, or a priority filter that includes the data parameters in the subset based on priority values assigned to the data parameters.

2. The system of claim 1, wherein the subset of the data parameters is a manually predetermined subset of the data parameters.

3. The system of claim 1, wherein the one or more processors also are configured to dynamically modify the data parameters in the subset by changing one or more of the data parameters in the subset one or more times during an operational cycle of the vehicle.

4. The system of claim 1, further comprising an interface gateway disposed between the publisher module and the applications, the interface gateway arbitrating requests from the applications for the data parameters and publication of the data parameters from the subset of the data parameters.

5. The system of claim 1, wherein:
the one or more processors are configured to regularly periodically communicate the data parameters in the subset to the one or more applications at predetermined time intervals.

6. The system of claim 1, wherein:
the one or more processors are configured to communicate to the one or more applications only the data parameters in the subset, the subset comprising fewer than all of the data parameters received by the one or more processors; and
the one or more applications are configured not to request any data parameters from the one or more processors other than the data parameters in the subset.

7. A communication system for a vehicle comprising:
one or more processors configured to receive data parameters associated with one or more conditions of the vehicle;
the one or more processors also are configured to output a selection of a subset of the data parameters; and
one or more processors are further configured to publish the data parameters in the subset to one or more applications of the vehicle that use the data parameters to perform one or more operations,
wherein the one or more processors also are configured to publish the data parameters in the subset to the one or more applications of the vehicle irrespective of communication of requests for the data parameters from the one or more applications;
wherein the one or more applications are configured to request from the one or more processors data parameters that are not in the subset only if the data parameters that are not in the subset have a priority value that is above a designated priority threshold.

8. The system of claim 7, wherein the one or more processors are configured to publish the data parameters in the subset during an entirety of a time that the one or more processors are operational to communicate data parameters generally.

9. The system of claim 7, wherein during all operational modes of the applications, the one or more applications are configured to request only the data parameters in the subset from the one or more processors.

10. The system of claim 7, wherein during at least one operational mode of the applications, the one or more applications are configured to request only the data parameters in the subset from the one or more processors.

11. The system of claim 7, wherein out of a totality of the data parameters requested by the one or more applications from the one or more processors, the applications are configured to request the data parameters in the subset as at least ninety percent of the totality.

12. The system of claim 7, wherein out of a totality of the data parameters requested by the one or more applications from the one or more processors, the applications are configured to request the data parameters in the subset as at least ninety-five percent of the totality.

13. A communication system for a vehicle comprising:
one or more processors configured to receive data parameters associated with one or more conditions of the vehicle;
the one or more processors also configured to output a selection of a subset of the data parameters; and
the one or more processors are further configured to publish the data parameters in the subset to one or more applications of the vehicle that use the data parameters to perform one or more operations,
wherein the one or more processors are configured to publish only the data parameters in the subset unless a request for a data parameter not in the subset is received from one of the one or more applications and the request is above a designated priority threshold.

14. The system of claim 13, wherein the priority threshold is set such that out of a totality of the data parameters published by the one or more processors, the data parameters in the subset comprise at least ninety percent of the totality.

15. The system of claim 13, wherein the priority threshold is set such that out of a totality of the data parameters published by the one or more processors, the data parameters in the subset comprise at least ninety-five percent of the totality.

16. A method for communicating data parameters in a rail vehicle, the method including:
receiving data parameters associated with one or more conditions of the rail vehicle or other powered system;
selecting, with the one or more processors, a subset of the data parameters; and
publishing, with the one or more processors, the data parameters in the subset to one or more applications that use the data parameters to perform one or more operations;
wherein the selecting step includes dynamically modifying which of the data parameters are included in the subset;

wherein the selecting step includes applying one or more filters to determine which of the data parameters are included in the subset:, wherein the filters include at least one of a category filter that includes the data parameters in the subset based on a type of the data parameters, a frequency filter that includes the data parameters in the subset based on frequencies at which the applications request the data parameters, a use filter that includes the data parameters in the subset based on how the data parameters are used by the applications, or a priority filter that includes the data parameters in the subset based on priority values assigned to the data parameters.

17. The method of claim 16, wherein the selecting step includes manually selecting a predetermined subset of the data parameters.

18. The method of claim 16, wherein the data parameters in the subset are dynamically modified by changing one or more of the data parameters in the subset one or more times during an operational cycle of the powered system.

19. A non-transitory computer readable storage medium for a communication system of a rail vehicle or other powered system that includes one or more processors, the non-transitory computer readable storage medium including one or more sets of instructions configured to direct the one or more processors to:

receive data parameters associated with one or more conditions of the rail vehicle or other powered system;

select a subset of the data parameters; and publish the data parameters in the subset to one or more applications that use the data parameters to perform one or more operations;

wherein the one or more sets of instructions are configured to direct the one or more processors to dynamically modify which of the data parameters are included in the subset;

wherein the one or more sets of instructions are configured to direct the one or more processors to apply one or more filters to determine which of the data parameters are included in the subset;

wherein the filters include at least one of a category filter that includes the data parameters in the subset based on a type of the data parameters, a frequency filter that includes the data parameters in the subset based on frequencies at which the applications request the data parameters, a use filter that includes the data parameters in the subset based on how the data parameters are used by the applications, or a priority filter that includes the data parameters in the subset based on priority values assigned to the data parameters.

20. The non-transitory computer readable storage medium of claim 19, wherein the one or more sets of instructions are configured to direct the one or more processors to select the data parameters from a manually selected subset of the data parameters.

21. The non-transitory computer readable storage medium of claim 19, wherein the one or more sets of instructions are configured to direct the one or more processors to dynamically modify the data parameters by changing one or more of the data parameters in the subset one or more times during a trip of the consist.

* * * * *